(12) United States Patent
Fujiwara

(10) Patent No.: US 8,012,896 B2
(45) Date of Patent: Sep. 6, 2011

(54) OPTICAL GLASS, PREFORM FOR PRECISION PRESS MOLDING, METHOD FOR MANUFACTURING PREFORM FOR PRECISION PRESS MOLDING, OPTICAL ELEMENT, AND METHOD FOR MANUFACTURING OPTICAL ELEMENT

(75) Inventor: Yasuhiro Fujiwara, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 208 days.

(21) Appl. No.: 12/238,771

(22) Filed: Sep. 26, 2008

(65) Prior Publication Data

US 2009/0099002 A1    Apr. 16, 2009

(30) Foreign Application Priority Data

Sep. 27, 2007 (JP) ................. 2007-251498

(51) Int. Cl.
  *C03C 3/068* (2006.01)
  *C03C 3/062* (2006.01)
  *C03C 3/064* (2006.01)
  *C03C 3/066* (2006.01)
  *C03B 21/00* (2006.01)
  *C03B 23/00* (2006.01)
  *C03B 25/00* (2006.01)
  *C03B 27/00* (2006.01)
  *C03B 29/00* (2006.01)

(52) U.S. Cl. ................. 501/78; 501/73; 501/77; 501/79; 65/63; 65/64

(58) Field of Classification Search .................... 501/73, 501/77, 78, 79; 65/63, 64
See application file for complete search history.

(56) References Cited

U.S. PATENT DOCUMENTS

| 4,854,958 | A * | 8/1989 | Marechal et al. | 65/64 |
| 6,844,279 | B2 * | 1/2005 | Hayashi et al. | 501/50 |
| 7,368,404 | B2 * | 5/2008 | Uehara | 501/78 |
| 2003/0125186 | A1 * | 7/2003 | Hayashi et al. | 501/50 |
| 2005/0107240 | A1 * | 5/2005 | Uehara | 501/78 |
| 2007/0232477 | A1 * | 10/2007 | Fujiwara | 501/50 |

FOREIGN PATENT DOCUMENTS

JP  2002-249337 A  9/2002

* cited by examiner

*Primary Examiner* — Jerry Lorengo
*Assistant Examiner* — Noah S Wiese
(74) *Attorney, Agent, or Firm* — Sughrue Mion, PLLC

(57) ABSTRACT

The present invention relates to an optical glass having optical constants in the form of a refractive index nd of 1.70 or higher and an Abbé number nud of 50 or higher, a preform for precision press molding comprised of this glass, an optical element comprised of this glass, and methods for manufacturing the preform and the optical element.

38 Claims, 4 Drawing Sheets

OPTICAL GLASS, PREFORM FOR PRECISION PRESS MOLDING, METHOD FOR MANUFACTURING PREFORM FOR PRECISION PRESS MOLDING, OPTICAL ELEMENT, AND METHOD FOR MANUFACTURING OPTICAL ELEMENT

CROSS-REFERENCE TO RELATED APPLICATIONS

This application claims benefit of priority under 35 USC 119 to Japanese Patent Application No. 2007-251498 filed on Sep. 27, 2007, which is expressly incorporated herein by reference in its entirety.

BACKGROUND OF THE INVENTION

1. Field of the Invention

The present invention relates to an optical glass having optical constants in the form of a refractive index nd of 1.70 or higher and an Abbé number nud of 50 or higher, a preform for precision press molding comprised of this glass, an optical element comprised of this glass, and methods for manufacturing the preform and the optical element.

2. Discussion of the Background

With the appearance of digital cameras and portable telephones equipped with cameras, a high degree of integration and functional development has taken place rapidly in the apparatuses in which image pickup optical systems are mounted. At the same time, the demand for high-precision, lightweight, compact optical systems has intensified.

To meet this demand, optical designs employing aspherical lenses have become the mainstream in recent years. Thus, precision press molding techniques (also known as mold pressing techniques) of forming optically functional surfaces directly by press molding without a grinding or polishing step have attracted attention as methods of stably providing large quantities of inexpensive aspherical lenses employing highly functional glass, and the demand for optical glasses having low temperature softening properties that are suited to precision press molding has increased each year. Such optical glasses include high-refractive-index, low-dispersion glasses. An example of such a glass is described in Japanese Unexamined Patent Publication (KOKAI) No. 2002-249337, or English language family member U.S. No. 2003125186 A1, which are expressly incorporated herein by reference in their entirety).

To make full use of the advantages of such precision press molding techniques, it is desirable to directly manufacture a glass material known as a "preform for press molding" from a glass melt. This method, known as the preform hot forming method, comprises causing a glass melt to flow out, successively separating gobs of glass melt in quantities corresponding to single preforms, and cooling the glass melt gobs obtained to form preforms with smooth surfaces. Accordingly, this method affords advantageous characteristics in the form of a better glass use rate than methods in which large glass blocks are formed from glass melt and the blocks are cut, ground, and polished; in that no glass scraps are generated during processing; and in that less time and cost are incurred in processing.

In the hot forming method, a gob of glass melt in a quantity corresponding to a single preform must be accurately separated, and the preform must be formed without causing defects such as striae and devitrification. Accordingly, hot forming requires a glass having good glass stability in the high temperature range.

When raising the refractive index nd while maintaining an Abbé number nud at or above a certain value, the tendency of the glass to crystallize intensifies, and, as a result, vitrification becomes difficult. Further, crystals in the glass tend to precipitate out during the heating and softening steps in precision press molding. Imparting even softening properties at a lower temperature to the glass employed in precision press molding tends to diminish glass stability. Accordingly, it has been difficult to raise the refractive index nd to 1.70 or higher while maintaining an Abbé number nud of 50 or higher, desirably 52 or higher. It has also been difficult to achieve good resistance to devitrification during precision press molding and a level of glass stability permitting hot forming of preforms while imparting low temperature softening properties suited to precision press molding.

The present invention, devised to solve the above-stated problems, has for its object to provide an optical glass that has a refractive index nd of 1.70 or higher, an Abbé number nud of 50 or higher, and low temperature softening properties, and that exhibits good glass stability; a preform for precision press molding comprised of this glass; a method for manufacturing this preform; an optical element comprised of this glass; and a method for manufacturing this optical element.

The present inventors conducted extensive research into the thermal characteristics of optical glasses in determining optical glass compositions. They discovered that the low temperature softening properties and glass stability of an optical glass could be evaluated by measurement with a differential scanning calorimeter (DSC). A differential scanning calorimeter scans the temperature of a glass sample over a broad temperature range, measuring the heat generation and heat absorption of the sample at a variety of temperatures. Hereinafter, a temperature 120° C. higher than the glass transition temperature Tg will be denoted as "Tg+120° C." and a temperature 100° C. lower than the liquidus temperature LT will be denoted as "LT−100° C."

During precision press molding, the glass is generally maintained within a temperature range at or above the glass transition temperature Tg but not exceeding (Tg+120° C.). Glass in which crystals precipitate within this temperature range generate exothermic heat during crystallization. That is, crystals will precipitate during precision press molding in glass having an exothermic peak within this temperature range. Accordingly, the present inventors set as their first object the obtaining of a glass exhibiting no exothermic peak within a temperature range of greater than or equal to the glass transition temperature but not exceeding (Tg+120° C.) (in which the level of exotherm generated by the sample does not reach a maximum during scanning of this temperature range) to obtain an optical glass having high glass stability.

The present inventors set as their second object the obtaining of a glass in which just one endothermic peak was present within the temperature range of greater than or equal to (LT−100° C.) but not exceeding the liquidus temperature LT to obtain an optical glass having good low temperature softening properties. The glass is molten over this temperature range. In differential scanning calorimetric measurement, endothermic peaks generated within this high temperature range originate from the absorption of heat occurring simultaneously with the melting of crystals that have precipitated within the glass. The present inventors examined the relation between endothermic peaks produced in the high temperature range and glass stability in the course of molding a glass melt. They observed that, when an index A of the refractive index was defined as $$A = nd - 2.25 - 0.01 \times nud,$$

as the endothermic peak temperature differential of the respective glasses decreased, the liquidus temperature LT tended to decrease in glasses with comparable levels of index A, equal glass transition temperatures Tg, and multiple endothermic peaks within the temperature range greater than or equal to (LT−100° C.) but not exceeding the liquidus temperature LT. This tendency varied with the content of high refractive index components, and the ratio of the contents of these components, within the glass. Thus, optimizing the composition of high refractive index components to achieve a single endothermic peak was found to yield a glass with less tendency to crystallize during the outflow of glass melt at a given outflow temperature.

Further, when comparing the thermal characteristics of glasses with indices A of identical level and identical glass transition temperatures Tg, it was discovered that the property of exhibiting no exothermic peak within the temperature range greater than or equal to the glass transition temperature but not exceeding (Tg+120° C.), desirably the property of a low crystallization exothermic peak intensity (referred to as "low temperature stability"), and the property of the presence of just one endothermic peak within the temperature range of (LT−100° C.) or greater but not exceeding the liquidus temperature LT (referred to as "high temperature stability") were interrelated; it was discovered that increasing either the high temperature stability or the low temperature stability made it possible to increase the other.

Accordingly, the present inventors conducted further extensive research with the aim of obtaining a high-refractive-index, low-dispersion glass having the above-stated thermal characteristics. They discovered that in glasses in which $B_2O_3$ was incorporated as a network-forming component, rare earth components and the like were incorporated to impart a high refractive index and low dispersion characteristics, and $Li_2O$ was incorporated to lower the glass transition temperature without compromising the high refractive index and low dispersion characteristics, the stability of the glass depends on which rare earth component(s) is introduced. That is, when prescribed quantities of $La_2O_3$, $Gd_2O_3$, and $Y_2O_3$ were incorporated, a glass with a higher refractive index, higher dispersion, and greater stability was obtained.

The present inventors conducted further examination based on this information, and were thus able to devise the present invention.

SUMMARY OF THE INVENTION

[1] An optical glass having a refractive index nd of 1.70 or higher and an Abbé number nud of 50 or higher, comprising, denoted as molar percentages:

| | |
|---|---|
| $B_2O_3$ | 40 to 75 percent, |
| $SiO_2$ | greater than 0 percent but not exceeding 15 percent, |
| $Li_2O$ | 1 to 10 percent, |
| ZnO | 0 to 15 percent, |
| $La_2O_3$ | 5 to 22 percent, |
| $Gd_2O_3$ | 3 to 20 percent, |
| $Y_2O_3$ | greater than or equal to 0 percent but less than 1 percent, |
| $ZrO_2$ | 0 to 10 percent, |
| MgO | 0 to 5 percent, |
| CaO | 0 to 5 percent, and |
| SrO | 0 to 5 percent. |

[2] The optical glass in accordance with [1], wherein the molar ratio of $(La_2O_3+Gd_2O_3+Y_2O_3)/(B_2O_3+SiO_2)$ is desirably 0.365 or less.

[3] The optical glass in accordance with [1] or [2], wherein the molar ratio of $Y_2O_3/(La_2O_3+Gd_2O_3+Y_2O_3)$ is desirably 0 to 0.2.

[4] An optical glass having a refractive index nd of 1.70 or higher and an Abbé number nud of 50 or higher, comprising, denoted as molar percentages:

| | |
|---|---|
| $B_2O_3$ | 40 to 75 percent, |
| $SiO_2$ | greater than 0 percent but not exceeding 15 percent, |
| $Li_2O$ | 1 to 10 percent, |
| ZnO | 0 to 15 percent, |
| $La_2O_3$ | 5 to 22 percent, |
| $Gd_2O_3$ | 3 to 20 percent, |
| $ZrO_2$ | greater than 5 percent but not exceeding 10 percent, |
| MgO | 0 to 5 percent, |
| CaO | 0 to 5 percent, and |
| SrO | 0 to 5 percent. |

[5] The optical glass in accordance with any one of [1] to [4], wherein $B_2O_3/SiO_2$ desirably exceeds 5.5.

[6] The optical glass in accordance with any one of [1] to [5] wherein the total quantity of $B_2O_3$, $SiO_2$, $Li_2O$, ZnO, $La_2O_3$, $Gd_2O_3$, $ZrO_2$, MgO, CaO, and SrO is desirably 97 molar percent or greater; $Ta_2O_5$ is desirably incorporated as an optional component; the molar ratio of $ZnO/(La_2O_3+Gd_2O_3)$ is desirably 0.5 or lower; the molar ratio of $(CaO+SrO+BaO)/(La_2O_3+Gd_2O_3)$ is desirably 0.2 or lower; and the molar ratio of $(ZrO_2+Ta_2O_5)/(La_2O_3+Gd_2O_3)$ is desirably 0.4 or less.

[7] The optical glass in accordance with any one of [1] to [6], wherein the total quantity of $Li_2O$ and ZnO is desirably 5 to 15 molar percent and the molar ratio of $ZnO/Li_2O$ is desirably 3 or less.

[8] The optical glass in accordance with any one of [1] to [7], wherein the glass transition temperature Tg is desirably 635° C. or lower and the liquidus temperature LT is desirably 1,100° C. or lower.

[9] The optical glass in accordance with any one of [1] to [8] wherein thermal characteristics measured by differential scanning calorimetry desirably satisfy (a) and (b) below:

(a) no exothermic peak is present in a temperature range greater than or equal to the glass transition temperature Tg but not exceeding a temperature 120° C. higher than the glass transition temperature (Tg+120° C.);

(b) only one endothermic peak is present within a temperature range greater than or equal to a temperature 100° C. lower than the liquidus temperature LT (LT−100° C.) but not exceeding the liquidus temperature LT.

[10] The optical glass in accordance with any one of [1] to [9], desirably having a refractive index nd and an Abbé number nud satisfying equation (1) below:

$$nd \geq 2.25 - 0.01 \times nud \qquad (1).$$

[11] A preform for precision press molding comprised of the optical glass in accordance with any one of [1] to [10].

[12] An optical element comprised of the optical glass in accordance with any one of [1] to [10].

[13] A method for manufacturing a preform for precision press molding in which a glass melt gob is separated from an outflowing glass melt, and the glass melt gob is formed into a preform for precision glass molding in a cooling step, characterized in that:

the preform for precision press molding that is formed is comprised of the optical glass in accordance with any one of [1] to [10].

[14] A method for manufacturing an optical element by heating a preform for precision press molding in accordance with [11] or a preform for precision press molding that has been manufactured by a method in accordance with [13] and conducting precision press molding.

[15] The method for manufacturing an optical element in accordance with [14] desirably comprising introducing a preform for precision press molding into a pressing mold, heating the preform along with the pressing mold, and conducting precision press molding.

[16] The method for manufacturing an optical element in accordance with [14] desirably comprising heating a preform for precision press molding, introducing said preform into a preheated pressing mold, and conducting precision press molding.

BRIEF DESCRIPTION OF THE DRAWINGS

The present invention will be described in the following text by the exemplary, non-limiting embodiments shown in the figures, wherein:

In FIG. 1, 1: Upper mold, 2: Lower mold, 3: Sleeve mold, 4: Preform for precision press molding, 9: Support rod, 10: Holding member, 11: Quartz tube, 13: Pressing rod, 14: Thermocouple

DESCRIPTIONS OF THE EMBODIMENTS

Figure 1:
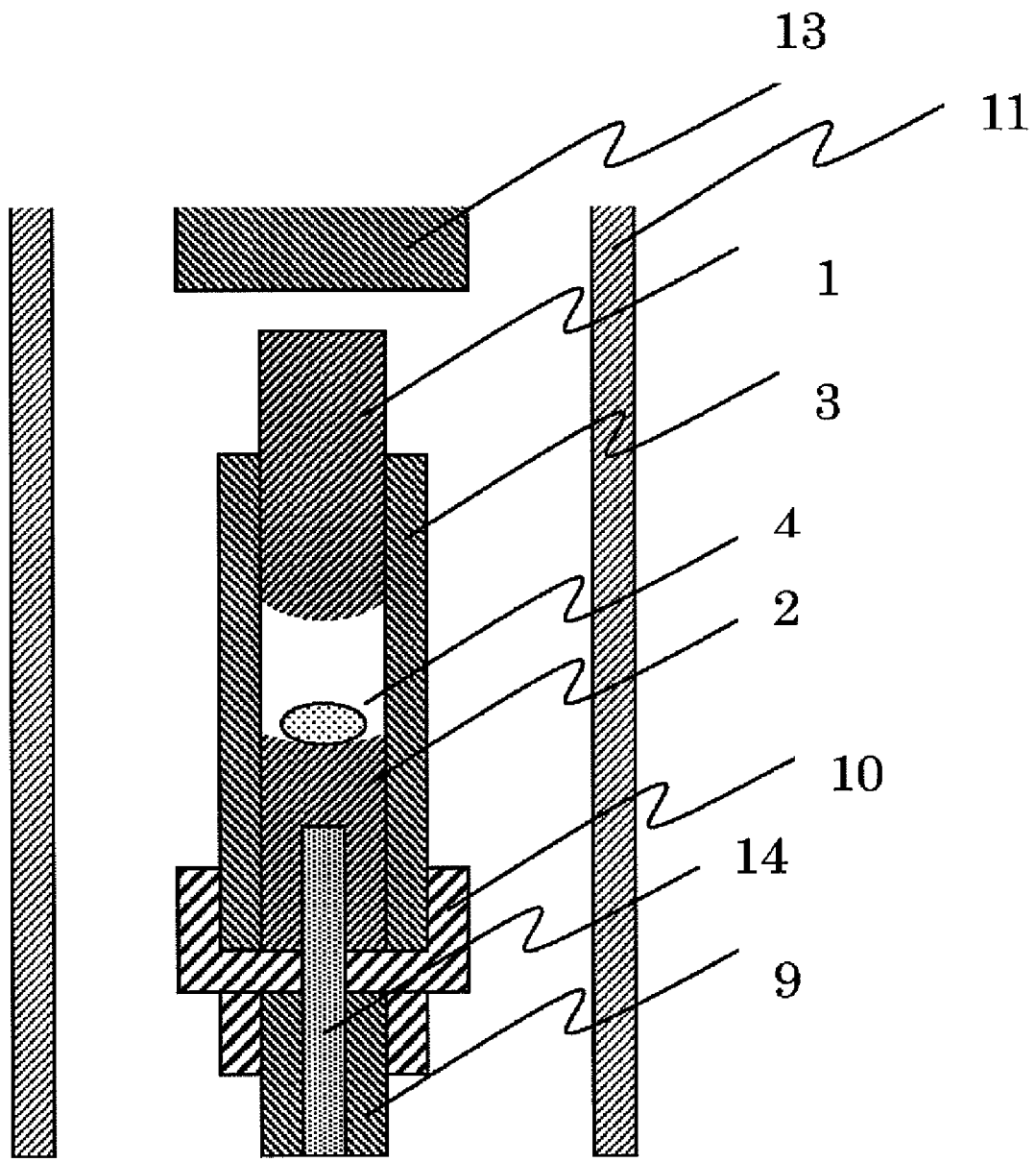
FIG. 1 is a descriptive sectional view of a precision press molding machine.

The following preferred specific embodiments are, therefore, to be construed as merely illustrative, and not limitative of the remainder of the disclosure in any way whatsoever. In this regard, no attempt is made to show structural details of the present invention in more detail than is necessary for the fundamental understanding of the present invention, the description taken with the drawings making apparent to those skilled in the art how the several forms of the present invention may be embodied in practice.

The present invention provides an optical glass having a refractive index nd of 1.70 or higher, an Abbé number nud of 50 or higher, low temperature softening properties, and good glass stability. The present invention further provides a preform for precision press molding comprised of this optical glass, a method for manufacturing this preform, an optical element comprised of this optical glass, and a method for manufacturing this optical element.

[The Optical Glass]

The optical glass of the present invention, having a refractive index nd of 1.70 or higher and an Abbé number nud of 50 or higher, comprises two aspects.

The first aspect of the optical glass of the present invention ("glass I" hereinafter), comprises, denoted as molar percentages:

| | |
|---|---|
| $B_2O_3$ | 40 to 75 percent, |
| $SiO_2$ | greater than 0 percent but not exceeding 15 percent, |
| $Li_2O$ | 1 to 10 percent, |
| ZnO | 0 to 15 percent, |
| $La_2O_3$ | 5 to 22 percent, |
| $Gd_2O_3$ | 3 to 20 percent, |
| $Y_2O_3$ | greater than or equal to 0 percent but less than 1 percent, |
| $ZrO_2$ | 0 to 10 percent, |
| MgO | 0 to 5 percent, |
| CaO | 0 to 5 percent, and |
| SrO | 0 to 5 percent. |

The second aspect of the optical glass of the present invention ("glass II" hereinafter) comprises, denoted as molar percentages:

| | |
|---|---|
| $B_2O_3$ | 40 to 75 percent, |
| $SiO_2$ | greater than 0 percent but not exceeding 15 percent, |
| $Li_2O$ | 1 to 10 percent, |
| ZnO | 0 to 15 percent, |
| $La_2O_3$ | 5 to 22 percent, |
| $Gd_2O_3$ | 3 to 20 percent, |
| $ZrO_2$ | greater than 5 percent but not exceeding 10 percent, |
| MgO | 0 to 5 percent, |
| CaO | 0 to 5 percent, and |
| SrO | 0 to 5 percent. |

The optical glass of the present invention will be described in greater detail below.

In both glasses I and II, $B_2O_3$ is incorporated as a network-forming component, rare earth components and the like are incorporated to impart a high refractive index and low dispersion characteristics, and $Li_2O$ is incorporated to lower the glass transition temperature without compromising the high refractive index and low dispersion characteristics. Rare earth components in the form of $La_2O_3$ and $Gd_2O_3$, are incorporated as essential components to achieve good glass stability at both high and low temperatures.

The composition of the optical glass of the present invention will be described next. The description set forth below, unless specifically stated otherwise, applies to both glasses I and II. The quantities of the various contents and their total quantities are given as molar percentages. Ratios of contents and ratios of total quantities, as well as ratios of contents to total quantities, are denoted as molar percentages.

In the present invention, the molar ratio of $(La_2O_3+Gd_2O_3+Y_2O_3)/(B_2O_3+SiO_2)$ means the ratio of the total content of $La_2O_3$, $Gd_2O_3$, and $Y_2O_3$ to the total content of $B_2O_3$ and $SiO_2$. The ratio of $Y_2O_3/(La_2O_3+Gd_2O_3+Y_2O_3)$ means the ratio of $Y_2O_3$ to the total quantity of $La_2O_3$, $Gd_2O_3$, and $Y_2O_3$. The molar ratio of $(CaO+SrO+BaO)/(La_2O_3+Gd_2O_3)$ means the ratio of the total content of CaO, SrO, and BaO to the total content of $La_2O_3$ and $Gd_2O_3$. The molar ratio of $ZnO/(La_2O_3+Gd_2O_3)$ means the ratio of the content of ZnO to the total content of $La_2O_3$ and $Gd_2O_3$. The molar ratio of $(ZrO_2+Ta_2O_5)/(La_2O_3+Gd_2O_3)$ means the ratio of the total content of $ZrO_2$ and $Ta_2O_5$ to the total content of $La_2O_3$ and $Gd_2O_3$. The molar ratio of $ZnO/Li_2O$ means the ratio of the content of ZnO to the content of $Li_2O$. The molar ratio of $(Li_2O/(B_2O_3+SiO_2)$ means the ratio of the content of $Li_2O$ to the total content of $B_2O_3$ and $SiO_2$. The molar ratio of $(La_2O_3/Gd_2O_3)$ means the ratio of the content of $La_2O_3$ to the content of $Gd_2O_3$. The molar ratio of $(Y_2O_3/(La_2O_3+Gd_2O_3+Y_2O_3)$ means the ratio of the content of $Y_2O_3$ to the total content of $La_2O_3$, $Gd_2O_3$, and $Y_2O_3$, respectively.

$B_2O_3$, a glass network-forming component, is an essential component that serves to impart a low dispersion characteristic and lower the glass transition temperature. When the content thereof is less than 40 percent, glass stability decreases and the liquidus temperature rises, making it difficult to form a preform. When an excessive quantity exceeding 75 percent is incorporated, the refractive index drops. Thus, the content of $B_2O_3$ in the optical glass of the present invention is 40 to 75 percent, desirably ranging from 45 to 70 percent, and preferably, ranging from 50 to 65 percent.

$SiO_2$ is an essential component that, when incorporated in suitable quantity, increases the stability of the glass and imparts suitable viscosity when forming preforms from glass melt. However, the incorporation of an excessive quantity lowers the refractive index and compromises the melting property of the glass. Accordingly, the quantity incorporated is greater than 0 percent but does not exceed 15 percent. The upper limit to this content is desirably 10 percent, preferably 9 percent or lower, more preferably 8 percent or lower, and most preferably, 7 percent or lower. The lower limit is desirably 1 percent, preferably 2 percent.

Both $B_2O_3$ and $SiO_2$ are glass network-forming components. The proportion of $B_2O_3$ is desirably higher than that of $SiO_2$ to achieve low dispersion. However, when the above-stated proportion becomes excessively high, viscosity drops and there is a risk of difficulty in forming the glass melt. When the above-stated proportion becomes excessively low, the glass transition temperature Tg and the liquidus temperature LT rise, causing the precision press molding property and the glass melt forming property to deteriorate. From these perspectives, the molar ratio of $B_2O_3/SiO_2$ desirably exceeds 5.5, is preferably greater than or equal to 5.7, is more preferably greater than or equal to 6.0, is still more preferably greater than or equal to 6.3, is still more preferably greater than or equal to 6.5, and is most preferably greater than or equal to 7.0. The upper limit of the above-stated molar ratio is, for example, 30 or lower, preferably 25 or lower, more preferably 23 or lower, still more preferably 20 or lower, even more preferably 17 or lower, and most preferably, 15 or lower.

$LiO_2$ is an essential component that serves to lower the glass transition temperature much more than other alkali metal oxide components in addition to raising the refractive index. It also improves the melting property of the glass. Incorporation in excessively low quantity makes it difficult to achieve these effects; incorporation in excessively high quantity lowers the resistance to devitrification of the glass, makes it difficult to directly form high-quality preforms from an outflowing glass melt, and decreases weatherability. Accordingly, the content is 1 to 10 percent, desirably 1 to 9 percent, preferably 1 to 8 percent, and most preferably, 1 to 7 percent.

From the perspectives of the glass transition temperature, the stability of the glass and the like, it is desirable to optimize the allocation of network-forming components and $Li_2O$. The molar ratio of $Li_2O/(B_2O_3+SiO_2)$ desirably falls within a range of 0.02 to 0.20, preferably within a range of 0.03 to 0.18, more preferably within a range of 0.04 to 0.16, still more preferably within a range of 0.05 to 0.15, and most preferably, within a range of 0.06 to 0.14.

ZnO is a component that lowers the melting temperature, liquidus temperature, and glass transition temperature; raises the chemical durability and weatherability of the glass; and raises the refractive index. However, when incorporated in a quantity in excess of 15 percent, it becomes difficult to maintain an Abbé number nud of 50 or higher. Thus, the content thereof is 0 to 15 percent, desirably 0 to 10 percent, preferably 0 to 9 percent, still more preferably 0 to 8 percent, and most preferably, 0 to 7 percent.

In the optical glass of the present invention, the total content ($Li_2O+ZnO$) of $Li_2O$ and ZnO is desirably 5 percent or greater to achieve desired low temperature softening properties. However, when the total content exceeds 15 percent, the resistance to devitrification of the glass decreases or dispersion increases. Thus, the total content of $Li_2O$ and ZnO is desirably 5 to 15 percent, preferably 6 to 14 percent, more preferably 6 to 12 percent, and most preferably, 7 to 12 percent.

To impart desired low temperature softening properties while maintaining an Abbé number nud of 50 or higher, the molar ratio of ($ZnO/Li_2O$) is desirably 0 to 3. The upper limit of the molar ratio ($ZnO/Li_2O$) is desirably 2.5, preferably 2.0, more preferably 1.5, still more preferably 1.2, even more preferably 1.1, and most preferably, 0.2. The lower limit is desirably 0.2, preferably 0.4.

$La_2O_3$ serves to raise the refractive index while maintaining low dispersibility, and enhances chemical durability and weatherability. When incorporated in suitable quantity, it is an essential component along with $Gd_2O_3$ among the rare earth components for improving the stability of the glass. However, introduction in excessive quantity lowers the stability of the glass and raises the glass transition temperature. Thus, the content thereof is 5 to 22 percent, desirably 6 to 20 percent, preferably 7 to 18 percent, more preferably 8 to 16 percent, and most preferably, 9 to 14 percent.

$Gd_2O_3$ is an essential component functioning in the same manner as $La_2O_3$. However, when incorporated in excessive quantity, the stability of the glass decreases and the glass transition temperature rises. Thus, the content is 3 to 20 percent, desirably 4 to 18 percent, preferably 5 to 16 percent, still more preferably 6 to 14 percent, and most preferably, 7 to 12 percent.

As set forth above, both $La_2O_3$ and $Gd_2O_3$ are incorporated as essential components to achieve both good optical characteristics (a high refractive index and low dispersion) and glass stability in the present invention. From the perspective of enhancing the stability of the glass, it is desirable to adjust the allocation of the content of $La_2O_3$ and the content of $Gd_2O_3$. The molar ratio of ($La_2O_3/Gd_2O_3$) is desirably kept within a range of 0.5 to 2.0, preferably within a range of 0.6 to 1.8, more preferably within a range of 0.8 to 1.6, still more preferably within a range of 0.9 to 1.5, and most preferably, within a range of 1.0 to 1.4. To achieve optical characteristics within the high refractive index and low dispersion ranges at which above-described index A is high, the molar ratio of ($La_2O_3/Gd_2O_3$) is desirably lowered.

$Y_2O_3$ is an optional component functioning in the same manner as $La_2O_3$ and $Gd_2O_3$. The incorporation of a small quantity affords the advantages of increasing the thermal stability of the glass and lowering the liquidus temperature. However, excessive incorporation lowers the stability of the glass and raises the glass transition temperature. In particular, increasing the amount of $Y_2O_3$ decreases glass stability in the high refractive index and low dispersion ranges at which above-described index A is high. Accordingly, in glass 1, the content of $Y_2O_3$ is greater than or equal to 0 percent but less than 1 percent. The content of $Y_2O_3$ in glass I is desirably 0 to 0.8 percent, preferably 0 to 0.6 percent. The content of $Y_2O_3$ in glass 11, as in glass 1, is desirably also greater than or equal to 0 percent but less than 1 percent, preferably 0 to 0.4 percent, more preferably 0 to 0.2 percent, and most preferably, no $Y_2O_3$ is incorporated.

For the above-stated reasons, the molar ratio of $Y_2O_3/(La_2O_3+Gd_2O_3+Y_2O_3)$ desirably falls within a range of 0 to 0.2, preferably within a range of 0 to 0.1, more preferably within a range of 0 to 0.05, and most preferably, is zero.

Increasing the ratio of $La_2O_3$, $Gd_2O_3$, and $Y_2O_3$ is desirable to maintain useful optical constants in the form of a high refractive index and low dispersion, but the more the ratio of these components is increased relative to glass network-forming components in the form of $B_2O_3$ and $SiO_2$, the more the liquidus temperature rises along with the refractive index and the greater the tendency for glass stability to drop. Accordingly, when this ratio is excessively high, glass stability deteriorates, the liquidus temperature drops, and the tendency toward devitrification increases. Thus, the ratio of $La_2O_3$, $Gd_2O_3$, and $Y_2O_3$ is desirably kept within a suitable range relative to the glass network-forming components. Specifically, the molar ratio of $(La_2O_3+Gd_2O_3+Y_2O_3)/(B_2O_3+SiO_2)$ is desirably 0.365 or lower. This molar ratio is preferably 0.360 or lower, more preferably 0.355 or lower, still more preferably 0.350 or lower, and most preferably, 0.345 or lower. From the perspective of maintaining desired characteristics, this molar ratio is, for example, 0.28 or higher, desirably 0.29 or higher, preferably 0.30 or higher, more preferably 0.31 or higher, and most preferably 0.315 or higher.

$ZrO_2$ is an optional component that is incorporated to enhance the weatherability of the glass and adjust optical constants. It increases the stability of the glass when incorporated in small quantities, but decreases the stability of the glass and increases dispersion when incorporated in excessive quantity. Thus, in glass I, the content is 0 to 10 percent, desirably 0 to 9 percent, preferably 0 to 8 percent, and most preferably, 0 to 7 percent. In glass II, the content is greater than 5 percent but not greater than 10 percent, desirably 0 to 8 percent, and most preferably, 0 to 7 percent.

When MgO is incorporated instead of ZnO or $Li_2O$, it lowers the dispersion of the glass and enhances chemical weatherability. However, the introduction of an excessive amount lowers the refractive index and raises the glass transition temperature. Thus, the content is 0 to 5 percent, desirably 0 to 3 percent, preferably 0 to 2 percent, more preferably 0 to 1 percent, and most preferably, 0 percent.

CaO serves to lower the glass transition temperature and adjust optical characteristics. However, when incorporated in excessive quantity, it decreases the stability of the glass and raises the liquidus temperature. Thus, the content is 0 to 5 percent, desirably 0 to 3 percent, preferably 0 to 2 percent, more preferably 0 to 1 percent and most preferably, 0 percent.

SrO serves to increase chemical durability and adjust optical characteristics. However, when incorporated in excessive quantity, it decreases the stability of the glass and raises the liquidus temperature. Thus, the content is 0 to 5 percent, desirably 0 to 3 percent, preferably 0 to 2 percent, more preferably 0 to 1 percent, and most preferably, 0 percent.

From the perspectives of raising the refractive index and lowering dispersibility, the molar ratio of $ZnO/(La_2O_3+Gd_2O_3)$ in the optical glass of the present invention is desirably 0 to 0.5. When this molar ratio exceeds 0.5, it is sometimes difficult to obtain the desired optical constants. This molar ratio is preferably 0 to 0.45, more preferably 0 to 0.4, still more preferably 0 to 0.35, and most preferably, 0 to 0.3.

The incorporation of components of smaller rather than larger ion radii as alkaline earth components is desirable from the perspective of achieving both a high refractive index of nd 1.7 or greater and glass stability. Thus, in the optical glass of the present invention, the molar ratio $(CaO+SrO+BaO)/(La_2O_3+Gd_2O_3)$ is desirably 0 to 0.2. When this molar ratio exceeds 0.2, it becomes difficult to achieve both a high refractive index and glass stability. This molar ratio is preferably 0 to 0.15, more preferably 0 to 0.1, still more preferably 0 to 0.05, and most preferably, zero.

To achieve the various glass properties set forth above in the optical glass of the present invention, the total content of $B_2O_3$, $SiO_2$, $Li_2O$, ZnO, $La_2O_3$, $Gd_2O_3$, $ZrO_2$, MgO, CaO, and SrO is desirably 97 percent or greater. When large amounts of components other than the above-described components of the optical glass of the present invention are incorporated, problems tend to occur, such as loss of low dispersibility, loss of the high refractive index characteristic, and loss of glass stability. This total content is desirably 98 percent or higher, preferably 99 percent or higher, and most preferably, 100 percent.

Additional optional components include $Ta_2O_5$, F, $Al_2O_3$, $Yb_2O_3$, $Sc_2O_3$, and $Lu_2O_3$ and the like.

$Ta_2O_5$ serves to raise the refractive index and increase dispersibility. The amount that is incorporated must be controlled. In the optical glass of the present invention, components imparting a high refractive index in the form of $La_2O_3$, $Gd_2O_3$, $ZrO_2$, and $Ta_2O_5$ can be divided into the group of $La_2O_3$ and $Gd_2O_3$, which maintains low dispersion characteristics, and the group of $ZrO_2$ and $Ta_2O_5$, which increases dispersion. The quantity of the optional component $Ta_2O_5$ that is incorporated is desirably limited by optimizing the ratio of the content of each of these groups. That is, in the optical glass of the present invention, the molar ratio of $(ZrO_2+Ta_2O_5)/(La_2O_3+Gd_2O_3)$ is desirably 0 to 0.4. When this molar ratio is less than or equal to 0.4, a low dispersion characteristic can be maintained. This molar ratio is preferably 0 to 0.35, more preferably 0 to 0.30, still more preferably 0 to 0.1, even more preferably 0 to 0.05, even more preferably, 0 to 0.02, and most preferably, 0.

For the above-stated reasons, the content of $Ta_2O_5$ is desirably kept to within a range of 0 to 3 percent, preferably 0 to 2 percent, more preferably 0 to 1 percent, still more preferably 0 to 0.5 percent, even more preferably, 0 to 0.2 percent, yet more preferably, 0 to 0.1 percent, and most preferably, is zero.

To enhance the thermal stability of the glass while maintaining a high refractive index and low dispersion characteristics, the molar ratio of $(ZrO_2+Ta_2O_5)/(La_2O_3+Gd_2O_3)$ is desirably kept low as set forth above, the quantity of $Ta_2O_5$ is reduced, or no $Ta_2O_5$ is incorporated.

In a $B_2O_3$—$La_2O_3$ composition, F serves to lower the glass transition temperature while expanding the range at which vitrification is possible in terms of optical characteristics. However, when $B_2O_3$ is also present, marked volatization is exhibited at high temperatures and volatization occurs during melting and forming of the glass. Thus, it becomes difficult to produce glass of constant refractive index. Further, material volatizing from the glass during precision press molding adheres to the pressing mold. When such a mold is repeatedly employed, there is a problem in that the surface precision of the lens decreases. Accordingly, the content of F is desirably kept to 10 percent or less, preferably 5 percent or less. In methods of directly forming preforms from a glass melt, striae caused by volatization occur and it becomes difficult to obtain optically homogenous preforms. Thus, the content of F is desirably kept to 3 percent or less, with no incorporation being preferred.

$Al_2O_3$ serves to increase chemical durability, but when incorporated in excessive quantity, lowers the refractive index and raises the glass transition temperature. Accordingly, the content thereof is desirably 0 to 10 percent, preferably 0 to 8 percent, more preferably 0 to 5 percent, still more preferably 0 to 3 percent, even more preferably 0 to 2 percent, and most preferably, 0 to 1 percent. As set forth above, no additional component in the form of $Al_2O_3$ need be incorporated.

$Sc_2O_3$ serves the same function as $La_2O_3$ and $Gd_2O_3$. The incorporation of a small quantity has the advantages of increasing the thermal stability of the glass and lowering the liquidus temperature. However, when incorporated in excessive quantity, these advantages are lost, the stability of the glass decreases, and the refractive index drops. Based on these points, the content is desirably 0 to 10 percent, preferably 0 to 6 percent, more preferably 0 to 3 percent, still more preferably 0 to 2 percent, even more preferably 0 to 1 percent, and most preferably, 0.1 to 1 percent. $Sc_2O_3$ is an expensive component; when cutting costs is a priority, no $Sc_2O_3$ need be incorporated.

$Yb_2O_3$ and $Lu_2O_3$ can both be incorporated. However, they reduce the thermal stability of the glass and markedly raise the liquidus temperature. Thus, $Yb_2O_3$ must be incorporated in a quantity of 0 to 5 percent, desirably 0 to 2 percent, preferably 0 to 1 percent, and more preferably, within a range kept to 0 to 0.5 percent. $Lu_2O_3$ must also be incorporated in a quantity of 0 to 5 percent, desirably 0 to 2 percent, preferably 0 to 1 percent, and more preferably, within a range kept to 0 to 0.5 percent. Both $Yb_2O_3$ and $Lu_2O_3$ are expensive components, and do not necessarily have to be incorporated into the optical glass of the present invention. Thus, to reduce cost, $Yb_2O_3$ and $Lu_2O_3$ are preferably not incorporated.

$GeO_2$ can be incorporated within a range of 0 to 10 percent for example. However, as an expensive component, the quantity incorporated is desirably kept to 0 to 5 percent, with no incorporation being preferred.

BaO markedly decreases the stability of the glass when incorporated in small quantity, so the content thereof is desirably limited to 0 to 2 percent, with no incorporation being preferred.

$Nb_2O_5$ and $TiO_2$ both strongly increase dispersion and greatly raise the Abbé number nud even when incorporated in small quantities. Thus, to maintain an Abbé number nud of 50 or higher, the quantity of $Nb_2O_5$ is desirably 0 to 2 percent, preferably 0 to 1 percent, with no incorporation being of greater preference. To maintain an Abbé number nud of 50 or higher, the quantity of $TiO_2$ is desirably 0 to 2 percent, preferably 0 to 1 percent, with no incorporation being of greater preference.

Since $WO_3$ and $Bi_2O_3$ behave in the same manner as $Nb_2O_5$ and $TiO_2$, the quantity of each that is incorporated is desirably 0 to 2 percent, preferably 0 to 1 percent, with no incorporation being of greater preference.

$Nb_2O_5$, $TiO_2$, $WO_3$, and $Bi_2O_3$ not only increase dispersion, but also increase glass coloration. Since the optical glass of the present invention has good light transparency even for a common optical glass, $Nb_2O_5$, $TiO_2$, $WO_3$, and $Bi_2O_3$ are desirably not incorporated so as to permit the utilization of such special properties.

So as not to negatively impact the environment, the incorporation of Pb, Cr, Cd, As, Th, T, and U is to be avoided. Pb was formerly employed as the main component of optical glass to increase the refractive index. However, in addition to the above problem, Pb presents additional problems in that it is readily reduced by precision press molding in a nonoxidizing gas environment, and precipitating metallic lead adheres to the molding surface of the pressing mold, compromising the surface precision of the press-molded product. $As_2O_3$ was also formerly added as a clarifying agent. However, in addition to the above problem, it oxidizes the molding surface of the pressing mold, creating a problem by shortening the service life of the mold, and is thus not to be incorporated.

Substances that cause the glass to develop color, such as Fe, Cu, and Co, are desirably not incorporated, unless to impart desired spectral characteristics to the glass.

$Sb_2O_3$ is an optional additive employed as a clarifying agent. When added in small quantity, it reduces absorption due to the reduction of impurities such as Fe, inhibiting coloration of the glass. However, when added in large quantity, this effect is lost and an effect of oxidizing the molding surface of the pressing mold during precision press molding results, negatively affecting the service life of the pressing mold. Thus, $Sb_2O_3$ is desirably not added in large quantity from the viewpoint of precision press molding. Accordingly, the quantity added, relative to the whole, is desirably 0 to 0.5 weight percent, preferably 0 to 0.2 weight percent, more preferably 0 to 0.1 weight percent, and most preferably, 0 to 0.05 weight percent.

The optical characteristics and thermal characteristics of the optical glass of the present invention will be described next.

Raising the refractive index of a glass is effective for reducing the absolute amount of curvature of the optically functional surface of a lens, facilitating the processing of the molding surface of the pressing mold employed in precision press molding, and achieving a more compact optical system. Lowering the dispersion of a glass is effective for reducing and correcting chromatic aberration. Thus, achieving a high refractive index and low dispersion in a glass is extremely significant. From these perspectives, the optical glass of the present invention desirably satisfies equation (1) below, preferably satisfies equation (2) below, more preferably satisfies equation (3) below, and most preferably, satisfies equation (4) below:

$$nd \geq 2.25 - 0.01 \times nud \quad (1),$$

$$nd \geq 2.2600 - 0.01 \times nud \quad (2),$$

$$nd \geq 2.2650 - 0.01 \times nud \quad (3),$$

$$nd \geq 2.2675 - 0.01 \times nud \quad (4).$$

However, glass stability tends to decrease when attempting to go beyond optical characteristic ranges where the refractive index nd has been raised to 1.70 or higher and the dispersion has been lowered to an Abbé number nud of 50 or higher. When directly forming preforms for precision press molding from glass melt gobs, an excessively high refractive index and excessively low dispersion are undesirable for maintaining a good state of glass stability. Optical characteristics are desirably set to within ranges satisfying equation (5) below and preferably set to within ranges satisfying equation (6) below. However, even in these cases, it is desirable to set the optical characteristics to within ranges satisfying equations (1) to (4):

$$nd \leq 2.2850 - 0.01 \times nud \quad (5),$$

$$nd \leq 2.2750 - 0.01 \times nud \quad (6),$$

In the composition of the optical glass of the present invention, adjustment of the ratio of the glass forming components $B_2O_3$ and $SiO_2$ to the high refractive index-imparting components $La_2O_3$, $Gd_2O_3$, and $Y_2O_3$ to within the above-stated desirable range and adjustment of the ratio of $B_2O_3$ and $SiO_2$ to within the above-stated desirable range, for example, are effective means of obtaining a glass having the above-stated characteristics.

The optical glass of the present invention is a low dispersion glass with an Abbé number nud of 50 or higher. From the perspective of a glass with low dispersibility, the Abbé number nud is desirably 51 or higher, preferably 52 or higher, more preferably 52.5 or higher, still more preferably 53 or higher, and most preferably, 54 or higher. The upper limit is 60, for example. Further, the refractive index nd of the optical glass of the present invention is 1.70 or higher, desirably 1.71 or higher, and preferably, 1.72 or higher. The upper limit is, for example, 1.80.

A low glass transition temperature suited to precision press molding can be achieved in the optical glass of the present invention. The glass transition temperature range is desirably 635° C. and lower, preferably 630° C. and lower, and most preferably, 625° C. and lower. An excessively low glass transition temperature makes achieving a high refractive index and low dispersion even harder, and/or tends to lower glass stability and chemical durability. Thus, a glass transition temperature of 535° C. or higher is desirable, 555° C. or higher is preferable, and 565° C. or higher is of still greater preference.

The optical glass of the present invention has good glass stability. For example, taking stability in the high temperature range, which is required for forming glass from glass melt, as a yardstick, a glass having a liquidus temperature of 1,100° C. or lower can be achieved. Since the liquidus temperature can be maintained at or below a prescribed temperature while maintaining a high refractive index and low dispersion in the optical glass of the present invention, it is possible to directly form preforms for precision press molding from a glass melt. The range of the liquidus temperature is desirably 1,090° C. and lower, preferably 1060° C. and lower, more preferably 1,050° C. and lower, more preferably 1,040° C. and lower, still more preferably 1,035° C. and lower, even more preferably 1,030° C. and lower, and most preferably, 1,025° C. and lower.

As set forth above, the thermal characteristics of the optical glass of the present invention as measured by differential scanning calorimetry desirably satisfy (a) and (b) below:
(a) no exothermic peak is present in a temperature range greater than or equal to the glass transition temperature Tg but not exceeding a temperature 120° C. higher than the glass transition temperature (Tg+120° C.);
(b) only one endothermic peak is present within a temperature range greater than or equal to a temperature 100° C. lower than the liquidus temperature LT (LT−100° C.) but not exceeding the liquidus temperature LT.

Glasses satisfying (a) and (b) above afford both glass stability and low temperature softening properties and are suited to precision press molding. As set forth above, $B_2O_3$ is incorporated as a glass network-forming component, and rare earth components in the form of $La_2O_3$ and $Gd_2O_3$ are incorporated as essential components in the present invention to impart high refractive index and low dispersion characteristics. $Li_2O$ is also incorporated to lower the glass transition temperature without losing the high refractive index and low dispersion characteristics. Thus, the above thermal characteristics are achieved in a high-refractive-index, low-dispersion glass. The above thermal characteristics can be measured with a differential scanning calorimeter (such as a DSC 3300SA made by Bruker AXS) at a rate of temperature increase of 10° C./minute, for example. The glass stability obtained by differential scanning calorimetry is generally evaluated based on the intensity of the exothermic peak of crystallization. Specifically, the smaller the exothermic peak of crystallization, the lower the tendency of the glass to crystallize and thus the higher the stability of the glass, which is desirable in the glass of the present invention.

For example, the height or area of the exothermic peak of crystallization is 10-fold or less, desirably 5-fold or less, preferably 3-fold or less, and more preferably, 1-fold or less the endothermic peak accompanying glass transition. Most preferably, no clear exothermic peak is observed.

The optical glass of the present invention exhibits good light transparency. Quantitatively, a low degree of coloration is achieved such that the lambda 80 (nm) is for example, 410 nm or lower, desirably 400 nm or lower, preferably 390 nm or lower, more preferably 380 nm or lower, still more preferably 370 nm or lower, even more preferably 360 nm or lower, and most preferably 350 nm or lower. The lambda 80 (nm) is obtained as set forth below. A glass sample 10.0±0.1 mm in thickness having optically polished, mutually parallel, flat surfaces is employed. Light of intensity $I_{in}$ is directed to orthogonally enter one of the flat surfaces and the light of intensity $I_{out}$ exiting the other flat surface is measured. The external transmittance ($I_{out}/I_{in}$) is calculated. The external transmittance is obtained over a wavelength range of 280 to 700 nm, and the wavelength at which the external transmittance becomes 80 percent is adopted as lambda 80 (nm). In common optical glasses to which no coloring agents are added, such as the optical glass of the present invention, almost no absorption is observed to the long wavelength side of the absorption limit, from the ultraviolet region to the visible light region. An internal transmittance exceeding 80 percent is obtained in the wavelength region from lambda 80 (nm) to 1,550 nm in a glass sample 10.0±0.1 mm in thickness having optically polished, mutually parallel, flat surfaces, and a high internal transmittance exceeding 90 percent is obtained in the long wavelength region from lambda 80+20 (nm) to 1,550 nm in a glass sample 10.0±0.1 mm in thickness having optically polished, mutually parallel, flat surfaces. Further, lambda 70 (nm) and lambda 5 (nm) shown in Table 1, described further below, are the wavelengths at which the external transmittance becomes 70 percent and 5 percent, respectively. The method of calculation is based on that of lambda 80.

The optical glass of the present invention is suited to use in the lenses constituting the optical systems employed in recording on and reproducing from optical disks such as DVDs and CDs, in addition to being suitable as a material for use in lenses constituting image pickup optical systems. As an example, the optical glass of the present invention is suited to optical elements for recording and reproducing data with blue-violet light (such as a semiconductor laser beam with a wavelength of 405 nm) that utilize its good light transparency. As a more specific example, it is suitable as an objective lens for use with 23 GB high-recording-density DVDs. Aspherical lenses with numerical apertures of 0.85 are the mainstream among such objective lenses. Such lenses have a high ratio of center thickness to effective diameter. However, since the optical glass of the present invention has a high refractive index while retaining low dispersibility, this ratio can be reduced. Since the thickness of a lens passing blue-violet light can be reduced, blue-violet light loss can be reduced even further than what is possible due to the good light transparency of the glass. Diminishing the ratio of the center thickness to the effective diameter is desirable for precision press molding. That is, the volume of a preform for precision press molding is determined by the volume of the lens. Since the above objective lens is small, the preform employed in molding is suitably spherical or has the shape of an ellipsoid of revolution. When employing a spherical preform when the curvature of the convex surface of the lens is large (ie, the radius of curvature is small), atmospheric gas becomes trapped between the pressing mold and the glass, and a problem known as a gas trap tends to occur in the form of an area where the glass fails to reach. Reducing the ratio of the center thickness to the effective diameter plays a part in increasing the curvature of the convex surface of a lens, and is thus desirable in fabricating lenses with high surface precision by precision press molding.

The method for manufacturing the optical glass of the present invention will be described next. The optical glass of the present invention can be manufactured by heating and melting glass starting materials. Carbonates, nitrates, oxides, and the like can be suitably employed as glass starting materials. The starting materials are weighed out in prescribed proportions and mixed to prepare a blended starting material. This blended starting material is placed in a melting furnace that has been heated to 1,200 to 1,300° C., for example, and then melted, clarified, stirred, and homogenized to obtain a homogenous glass melt free of bubbles and unmelted material. The glass melt is formed in a shape and slow cooled to obtain the optical glass of the present invention.

[Preform for Precision Press Molding and Method for Manufacturing a Preform for Precision Press Molding]

The present invention further relates to a preform for precision press molding that is comprised of the optical glass of the present invention; and a method for manufacturing a preform for precision press molding in which a glass melt gob is separated from an outflowing glass melt, and the glass melt gob is formed into a preform for precision glass molding in a cooling step, characterized in that the preform for precision press molding that is formed is comprised of the optical glass of the present invention. The preform for precision press molding of the present invention and the method for manufacturing a preform for precision press molding of the present invention will be described below.

The preform is a molded glass article of equal mass to the precision press molded product. The preform is formed into a suitable shape based on the shape of the precision press molded product. This shape may be spherical or that of an ellipsoid of revolution, for example. The preform is heated to a viscosity permitting precision press molding and subjected to precision press molding.

The preform for precision press molding of the present invention is comprised of the above-described optical glass of the present invention. As needed, a thin film such as a mold release film can be provided on the surface of the preform of the present invention. The preform can be employed to precision press molding of optical elements having desired optical constants. Since the glass is highly stable in the high temperature range and the viscosity as the glass melt flows out can be increased, the method of forming glass gobs by separation from a glass melt flowing out of a pipe and forming the glass gobs into preforms in a cooling step affords the advantage of permitting the manufacturing of high-quality preforms with high productivity.

The method for manufacturing a preform for precision press molding of the present invention, in which a glass melt gob is separated from an outflowing glass melt and the glass melt gob is formed into a preform for precision glass molding in a cooling step, with the preform for precision press molding that is formed being comprised of the optical glass of the present invention, is one method of manufacturing the preform of the present invention. A specific example is a manufacturing method in which a glass melt gob of prescribed weight is separated from a glass melt flow exiting a pipe or the like, and a preform of prescribed weight is formed in a step in which the glass gob is cooled. This method affords the advantages of not requiring mechanical processing such as cutting, grinding, or polishing. Preforms that are subjected to mechanical processing require that glass strain be reduced to a nondamaging degree by conducting annealing prior to the mechanical processing step. However, no damage-preventing annealing step is necessary in the above method. It is also possible to form preforms with smooth outer surfaces. In this method, from the perspective of imparting smooth, clean surfaces, the preform is desirably formed while in a floating state generated by the application of wind pressure. The preform is also desirably comprised of free surfaces. Preforms without cutting scars known as "shear marks" are also desirable. Shear marks occur during the cutting of an outflowing glass melt with a cutting blade. When shear marks remain at the stage of molding into a precision press molded product, portions where shear marks are present end up becoming defects. Thus, shear marks are desirably eliminated at the preform stage. Methods of separating the glass melt without employing a cutting blade and without producing shear marks include the method of dripping a glass melt from an outflow pipe and the method of supporting the front end of a glass melt flow exiting an outflow pipe and then removing the support at a timing permitting the separation of a glass melt gob of prescribed weight (referred to as the "drop-cut method"). In the drop-cut method, the glass is separated at a constriction formed between the front end side and the outflow pipe side of the glass melt flow, making it possible to obtain a glass melt gob of prescribed weight. Next, while the glass melt gob obtained is still in a softened state, it is formed into a shape suited to press molding.

The method of fashioning a molded glass product from a glass melt and cutting or slicing, grinding, and polishing the molded product can be employed as a method of manufacturing the preform of the present invention. In this method, a molded glass product comprised of the above-described optical glass is formed by causing the glass melt to flow into a casting mold and then subjecting the molded glass product to mechanical processing to fashion a preform of prescribed weight. The glass is desirably subjected to adequate strain-removing processing in the form of annealing prior to the mechanical processing so as to prevent damaging the glass.

[Optical Element and Method for Manufacturing an Optical Element]

The optical element of the present invention is comprised of the above-described optical glass of the present invention. The optical element of the present invention has the same characteristic in the form of high refractive index and low dispersion as the optical glass of the present invention of which it is comprised.

Examples of the optical element of the present invention are: various lenses such as spherical lenses, aspherical lenses, and microlenses; diffraction gratings; lenses with diffraction gratings; lens arrays; and prisms. From the viewpoint of applications, examples are: the lenses constituting image pickup optical systems such as digital still cameras, digital video cameras, single-lens reflex cameras, cameras mounted on portable telephones, and vehicle-mounted cameras; and lenses constituting optical systems for reading and writing data to and from optical disks such as DVDs and CDs (for example, the above-described objective lenses).

The above-described optical element is desirably obtained by heat softening and precision press molding the preform of the present invention.

As needed, an optical thin film such as an antireflective film, fully reflective film, partially reflective film, or a film having spectral properties may be provided on the optical element.

The method for manufacturing an optical element will be described next.

In the method for manufacturing an optical element of the present invention, the preform of the present invention, or a preform for precision press molding that has been manufactured by the method for manufacturing a preform of the present invention, is heated and precision press molded to manufacture an optical element.

Precision press molding methods, also known as mold optics molding methods, are already well-known in the field of art to which the present invention belongs.

Any surface of an optical element that passes, refracts, diffracts, or reflects light rays is called an optically functional surface. In the example of lenses, lens surfaces such as the aspherical surface of an aspherical lens and the spherical surface of a spherical lens correspond to optically functional surfaces. Precision press molding is a method of press molding optically functional surfaces by precisely transferring the molding surface of the pressing mold to the glass. There is no need for mechanical processing such as grinding or polishing to finish optically functional surfaces.

Accordingly, the method for manufacturing an optical element of the present invention is suited to the manufacturing of lenses, lens arrays, diffraction gratings, prisms, and the like. It is particularly suited to manufacturing aspherical lenses with high productivity.

The method for manufacturing an optical element of the present invention permits the manufacturing of optical elements having the above-described optical characteristics. Since it employs a preform comprised of optical glass having low temperature softening properties, the press molding of glass can be conducted at relatively low temperature. Thus, the load on the molding surface of the pressing mold is reduced and the service lifetime of the pressing mold (the mold-release film when a mold-release film is provided on the molding surface) is extended. Since the glass constituting the preform is of high stability, devitrification of the glass can be effectively prevented during the reheating and pressing steps. A whole series of steps for obtaining the final product from the glass melt can be conducted with high productivity.

A known pressing mold, such as a pressing mold made of silicon carbide, an ultrahard material, or stainless steel on the molding surface of which has been provided a mold-release film can be employed in precision press molding. Carbon-containing films, noble metal alloy films, and the like can be employed as the mold-release film. The pressing mold is equipped with an upper mold and a lower mold, as well as a sleeve mold when needed. Of these, to effectively minimize or prevent damage to the molded glass article during press molding, the use of a silicon carbide pressing mold or an ultrahard alloy pressing mold (particularly a pressing mold made of an ultrahard alloy not containing binder, such as a WC pressing mold) is desirably employed. It is also desirable for a carbon-containing film to be provided as a mold-release film on the molding surface of the mold.

In precision press molding, the atmosphere during molding is desirably replaced with a nonoxidizing gas to maintain the molding surfaces of the pressing mold in good condition. Desirable nonoxidizing gases are nitrogen and mixed gases of nitrogen and hydrogen. In particular, when employing a pressing mold the molding surfaces of which have been equipped with a mold-release film in the form of a carbon-containing film, and when employing a pressing mold comprised of silicon carbide, it is necessary to conduct precision press molding in the above-described nonoxidizing atmosphere.

A precision press molding method that is particularly suited to the method for manufacturing an optical element of the present invention will be described next.

(Precision Press Molding Method 1)

In this method, a preform is introduced into the pressing mold, the pressing mold and the preform are heated together, and precision press molding is conducted (referred to as Precision Press Molding Method 1).

In Precision Press Molding Method 1, both the temperature of the pressing mold and that of the preform are desirably increased to a temperature at which the glass constituting the preform exhibits a viscosity of $10^6$ to $10^{12}$ dPa·s, and precision press molding is conducted.

The precision press molded article is desirably removed from the pressing mold once the glass has been cooled to a temperature at which it exhibits a viscosity of $10^{12}$ dPa·s or greater, preferably $10^{14}$ dPa·s or greater, and most preferably, $10^{16}$ dPa·s or greater.

The above-described conditions permit a more precise transfer of the shape of the molding surfaces of the pressing mold to the glass, as well as permitting removal of the precision press molded article without deformation.

(Precision Press Molding Method 2)

This method is characterized in that a preform for precision press molding is heated, introduced into a preheated pressing mold, and precision press molded (referred to as "Precision Press Molding Method 2" below). This method permits the manufacturing of optical elements of good surface precision that are free of defects with a shortened cycle time because the preform is preheated prior to being introduced into the pressing mold.

The temperature to which the pressing mold is preheated is desirably lower than the temperature to which the preform is preheated. Since such preheating keeps the heating temperature of the pressing mold down, wear and tear on the pressing mold is reduced.

In Precision Press Molding Method 2, the preform is desirably preheated to a temperature at which the glass constituting the preform exhibits a viscosity of $10^9$ dPa·s or lower, preferably $10^9$ dPa·s.

It is also desirable for the preform to be preheated while being floated, and preferable for preheating to be conducted so that the glass constituting the preform exhibits a viscosity of $10^{5.5}$ to $10^9$ dPa·s, preferably $10^{5.5}$ dPa·s or greater but less than $10^9$ dPa·s.

It is desirable for cooling of the glass to begin simultaneously with the start of pressing or during pressing.

The temperature of the pressing mold is desirably adjusted to be lower than the temperature to which the preform is preheated; a temperature at which the glass exhibits a viscosity of $10^9$ to $10^{12}$ dPa·s may be employed as a yardstick.

In this method, after press molding, the mold is desirably released following cooling to a temperature at which the glass exhibits a viscosity of $10^{12}$ dPa·s or greater.

The precision press-molded optical element is removed from the pressing mold and annealed as needed. When the molded article is an optical element such as a lens, the surface thereof can be coated with an optical thin film as needed.

Examples

The present invention is further described below through examples. However, the present invention is not limited to the forms shown in the embodiments.

Manufacturing Optical Glass

Table 1 gives the glass compositions of Examples 1 to 17 and Comparative Examples 1 and 2. For each of these glasses, starting materials of the various components in the form of corresponding oxides, hydroxides, carbonates, and nitrates were weighed out to yield the compositions shown in Table 1 following vitrification, thoroughly mixed, charged to a platinum crucible, melted at a temperature range of from 1,200 to 1,300° C. in an electric furnace, homogenized by stirring, and clarified. They were then cast into a metal mold that had been preheated to suitable temperature. The cast glass was cooled to the glass transition temperature and then immediately placed in an annealing furnace, where it was annealed to room temperature to obtain the various optical glasses.

The refractive index (nd), Abbé number (nud), specific gravity, glass transition temperature, and liquidus temperature of the various glasses obtained by the above method were measured by the following methods. The results are given in Table 1. Additionally, the results of measurement of the lambda 80, lambda 70, and lambda 5 of the various optical glasses of Examples 1 to 17 by the above-described method are given in Table 1.

(1) Refractive Index (nd) and Abbé Number (nud)

Measured for optical glasses obtained by cooling at a gradual temperature reduction rate of −30° C./hour.

(2) Glass Transition Temperature (Tg)

Measured at a rate of temperature increase of 4° C./minute with a thermomechanical analyzer made by Rikagu Denki K.K.

(3) Specific Gravity

Calculated by Archimedes' method.

(4) Liquidus Temperature (L.T.)

About 50 gram glass samples were charged to platinum crucibles and melted for about 15 to 60 minutes at about 1,200 to 1,300° C. The glass samples were then maintained at 980° C., 990° C., 1000° C., 1010° C., 1020° C., 1030° C., 1040° C., 1050° C., 1060° C., 1070° C., 1080° C., 1090° C., and 1100° C., for about 2 hours respectively; and cooled while observing with a microscope whether or not crystals precipitated. The lowest temperature at which crystals were not observed was adopted as the liquidus temperature (LT).

TABLE 1

| | Example No. | | | | | | |
|---|---|---|---|---|---|---|---|
| | 1 | 2 | 3 | 4 | 5 | 6 | 7 |
| $B_2O_3$ | 56.6 | 61.1 | 61.0 | 60.6 | 61.0 | 61.0 | 61.0 |
| $SiO_2$ | 5.4 | 5.7 | 5.6 | 5.6 | 5.6 | 5.6 | 5.7 |
| $Li_2O$ | 5.5 | 5.7 | 5.6 | 5.6 | 5.6 | 5.6 | 5.7 |
| ZnO | 5.4 | 6.0 | 6.0 | 6.0 | 6.0 | 6.0 | 2.3 |
| $La_2O_3$ | 11.9 | 11.6 | 11.5 | 11.5 | 11.5 | 11.5 | 11.6 |
| $Gd_2O_3$ | 8.7 | 9.9 | 9.8 | 9.8 | 9.8 | 9.8 | 9.9 |
| $Y_2O_3$ | 0.5 | 0.0 | 0.0 | 0.0 | 0.0 | 0.0 | 0.0 |
| $Sc_2O_3$ | 0.0 | 0.0 | 0.0 | 0.0 | 0.0 | 0.5 | 0.0 |
| $In_2O_3$ | 0.0 | 0.0 | 0.0 | 0.0 | 0.5 | 0.0 | 0.0 |
| $Al_2O_3$ | 0.0 | 0.0 | 0.5 | 0.0 | 0.0 | 0.0 | 0.0 |
| $Ga_2O_3$ | 0.0 | 0.0 | 0.0 | 0.9 | 0.0 | 0.0 | 0.0 |
| $ZrO_2$ | 6.0 | 0.0 | 0.0 | 0.0 | 0.0 | 0.0 | 3.8 |
| $Ta_2O_5$ | 0.0 | 0.0 | 0.0 | 0.0 | 0.0 | 0.0 | 0.0 |
| Total | 100.0 | 100.0 | 100.0 | 100.0 | 100.0 | 100.0 | 100.0 |
| $Li_2O/(B_2O_3 + SiO_2)$ | 0.09 | 0.09 | 0.08 | 0.08 | 0.08 | 0.08 | 0.09 |
| $La_2O_3/Gd_2O_3$ | 1.17 | 1.17 | 1.17 | 1.17 | 1.17 | 1.17 | 1.17 |
| $ZnO/(La_2O_3 + Gd_2O_3)$ | 0.28 | 0.28 | 0.28 | 0.28 | 0.28 | 0.28 | 0.11 |
| $(CaO + SrO + BaO)/(La_2O_3 + Gd_2O_3)$ | 0 | 0 | 0 | 0 | 0 | 0 | 0 |
| $(ZrO_2 + Ta_2O_5)/(La_2O_3 + Gd_2O_3)$ | 0 | 0 | 0 | 0 | 0 | 0 | 0.18 |
| $Y_2O_3/(La_2O_3 + Gd_2O_3 + Y_2O_3)$ | 0 | 0 | 0 | 0 | 0 | 0 | 0 |
| $Li_2O + ZnO$ | 11.7 | 11.7 | 11.6 | 11.6 | 11.6 | 11.6 | 8 |
| $ZnO/Li_2O$ | 1.05 | 1.05 | 1.07 | 1.07 | 1.07 | 1.07 | 0.4 |
| $(La_2O_3 + Gd_2O_3 + Y_2O_3)/(B_2O_3 + SiO_2)$ | 0.340 | 0.322 | 0.320 | 0.322 | 0.320 | 0.320 | 0.322 |
| $B_2O_3/SiO_2$ | 10.50 | 10.72 | 10.89 | 10.82 | 10.89 | 10.89 | 10.70 |
| Refractive index nd | 1.75536 | 1.73004 | 1.72924 | 1.73027 | 1.73134 | 1.73134 | 1.73854 |
| Abbé number vd | 51.35 | 54.04 | 54.1 | 53.78 | 53.88 | 53.88 | 52.94 |
| Glass transition temperature (° C.) | 626 | 616 | 615 | 614 | 617 | 617 | 628 |
| Sag temperature Ts (° C.) | 667 | 658 | 657 | 657 | 659 | 659 | 670 |
| Liquidus temperature LT (° C.) | 1060 | 1025 | 1035 | 1035 | 1035 | 1035 | 1045 |
| Viscosity at liquidus temperature (dPa · s) | | 5.37 | | | | | 4.63 |
| Specific gravity | 4.363 | 4.278 | 4.27 | 4.29 | 4.31 | 4.29 | 4.285 |
| Presence of exothermal peaks in temperature range Tg – (Tg + 120° C.) | Non | Non | Non | Non | Non | Non | Non |
| Number of endothermal peaks in temperautre range (LT – 100° C.) – LT | 1 | 1 | 1 | 1 | 1 | 1 | 1 |
| λ80 (nm) | | 361 | 361 | 361 | 359 | 359 | 358 |
| λ70 (nm) | | 341 | 342 | 342 | 339 | 339 | 335 |
| λ5 (nm) | | 277 | 278 | 278 | 277 | 277 | 258 |

| | Example No. | | | | | |
|---|---|---|---|---|---|---|
| | 8 | 9 | 10 | 11 | 12 | 13 |
| $B_2O_3$ | 61.3 | 61.3 | 62.3 | 59.7 | 56.7 | 56.3 |
| $SiO_2$ | 5.6 | 5.6 | 5.8 | 5.6 | 5.5 | 5.5 |
| $Li_2O$ | 5.6 | 5.6 | 5.8 | 5.6 | 5.5 | 5.5 |
| ZnO | 4.1 | 0.4 | 2.3 | 2.2 | 5.9 | 5.9 |
| $La_2O_3$ | 11.6 | 11.6 | 11.8 | 11.5 | 11.3 | 11.2 |
| $Gd_2O_3$ | 9.9 | 9.9 | 10.1 | 9.8 | 9.6 | 10.1 |
| $Y_2O_3$ | 0.0 | 0.0 | 0.0 | 0.0 | 0.0 | 0.0 |

TABLE 1-continued

|  | | | | | | |
|---|---|---|---|---|---|---|
| $Sc_2O_3$ | 0.0 | 0.0 | 0.0 | 0.0 | 0.0 | 0.0 |
| $In_2O_3$ | 0.0 | 0.0 | 0.0 | 0.0 | 0.0 | 0.0 |
| $Al_2O_3$ | 0.0 | 0.0 | 0.0 | 0.0 | 0.0 | 0.0 |
| $Ga_2O_3$ | 0.0 | 0.0 | 0.0 | 0.0 | 0.0 | 0.0 |
| $ZrO_2$ | 1.9 | 5.6 | 0.0 | 5.6 | 5.5 | 5.5 |
| $Ta_2O_5$ | 0.0 | 0.0 | 1.9 | 0.0 | 0.0 | 0.0 |
| Total | 100.0 | 100.0 | 100.0 | 100.0 | 100.0 | 100.0 |
| $Li_2O/(B_2O_3 + SiO_2)$ | 0.08 | 0.08 | 0.09 | 0.09 | 0.09 | 0.09 |
| $La_2O_3/Gd_2O_3$ | 1.17 | 1.17 | 1.17 | 1.17 | 1.18 | 1.11 |
| $ZnO/(La_2O_3 + Gd_2O_3)$ | 0.19 | 0.02 | 0.11 | 0.1 | 0.28 | 0.28 |
| $(CaO + SrO + BaO)/(La_2O_3 + Gd_2O_3)$ | 0 | 0 | 0 | 0 | 0 | 0 |
| $(ZrO_2 + Ta_2O_5)/(La_2O_3 + Gd_2O_3)$ | 0.09 | 0.26 | 0.09 | 0.26 | 0.26 | 0.26 |
| $Y_2O_3/(La_2O_3 + Gd_{2O3} + Y_2O_3)$ | 0 | 0 | 0 | 0 | 0 | 0 |
| $Li_2O + ZnO$ | 9.7 | 6 | 8.1 | 7.8 | 11.4 | 11.4 |
| $ZnO/Li_2O$ | 0.73 | 0.07 | 0.4 | 0.4 | 1.07 | 1.07 |
| $(La_2O_3 + Gd_2O_3 + Y_2O_3)/(B_2O_3 + SiO_2)$ | 0.321 | 0.321 | 0.322 | 0.326 | 0.336 | 0.345 |
| $B_2O_3/SiO_2$ | 10.95 | 10.95 | 10.74 | 10.66 | 10.31 | 10.24 |
| Refractive index nd | 1.73382 | 1.74262 | 1.74052 | 1.74628 | 1.75268 | 1.75446 |
| Abbé number νd | 53.52 | 52.33 | 51.82 | 52.15 | 51.55 | 51.53 |
| Glass transition temperature (° C.) | 620 | 636 | 627 | 627 | 615 | 615 |
| Sag temperature Ts (° C.) | 663 | 678 | 669 | 669 | 658 | 656 |
| Liquidus temperature LT (° C.) | 1045 | 1040 | 1035 | 1045 | 1035 | 1040 |
| Viscosity at liquidus temperature (dPa · s) | 4.12 | 4.39 | 4.69 | 4.12 | 5.12 | 5.06 |
| Specific gravity | 4.28 | 4.29 | 4.38 | 4.32 | 4.39 | 4.416 |
| Presence of exothermal peaks in temperature range Tg – (Tg + 120° C.) | Non | Non | Non | Non | Non | Non |
| Number of endothermal peaks in temperautre range (LT – 100° C.) – LT | 1 | 1 | 1 | 1 | 1 | 1 |
| λ80 (nm) | 357 | 360 | 361 | 362 | 362 | 370 |
| λ70 (nm) | 333 | 337 | 336 | 338 | 339 | 346 |
| λ5 (nm) | 257 | 275 | 277 | 276 | 276 | 279 |

| | Example No. | | | | Comp. Example 1 | Comp. Example 2 |
|---|---|---|---|---|---|---|
| | 14 | 15 | 16 | 17 | | |
| $B_2O_3$ | 56.6 | 54.7 | 56.3 | 61.1 | 57.8 | 54.5 |
| $SiO_2$ | 5.5 | 5.4 | 5.5 | 5.7 | 0.0 | 3.5 |
| $Li_2O$ | 5.5 | 4.5 | 5.4 | 5.7 | 0.0 | 0.0 |
| ZnO | 5.0 | 9.4 | 5.5 | 6.0 | 22.2 | 21.8 |
| $La_2O_3$ | 11.4 | 11.2 | 11.0 | 13.0 | 12.9 | 12.7 |
| $Gd_2O_3$ | 9.6 | 9.4 | 10.1 | 8.0 | 6.2 | 6.6 |
| $Y_2O_3$ | 0.0 | 0.0 | 0.0 | 0.5 | 0.9 | 0.9 |
| $Sc_2O_3$ | 0.0 | 0.0 | 0.0 | 0.0 | 0.0 | 0.0 |
| $In_2O_3$ | 0.0 | 0.0 | 0.0 | 0.0 | 0.0 | 0.0 |
| $Al_2O_3$ | 0.0 | 0.0 | 0.0 | 0.0 | 0.0 | 0.0 |
| $Ga_2O_3$ | 0.0 | 0.0 | 0.0 | 0.0 | 0.0 | 0.0 |
| $ZrO_2$ | 6.4 | 5.4 | 6.2 | 0.0 | 0.0 | 0.0 |
| $Ta_2O_5$ | 0.0 | 0.0 | 0.0 | 0.0 | 0.0 | 0.0 |
| Total | 100.0 | 100.0 | 100.0 | 100.0 | 100.0 | 100.0 |
| $Li_2O/(B_2O_3 + SiO_2)$ | 0.09 | 0.07 | 0.09 | 0.09 | 0 | 0 |
| $La_2O_3/Gd_2O_3$ | 1.19 | 1.19 | 1.09 | 1.09 | 2.08 | 1.94 |
| $ZnO/(La_2O_3 + Gd_2O_3)$ | 0.24 | 0.47 | 0.26 | 0.26 | 1.16 | 1.13 |
| $(CaO + SrO + BaO)/(La_2O_3 + Gd_2O_3)$ | 0 | 0 | 0 | 0 | 0 | 0 |
| $(ZrO_2 + Ta_2O_5)/(La_2O_3 + Gd_2O_3)$ | 0.3 | 0.26 | 0.29 | 0.29 | 0 | 0 |
| $Y_2O_3/(La_2O_3 + Gd_{2O3} + Y_2O_3)$ | 0 | 0 | 0 | 0 | 0.05 | 0.04 |
| $Li_2O + ZnO$ | 10.5 | 13.9 | 10.9 | 10.9 | 22.2 | 21.8 |
| $ZnO/Li_2O$ | 0.91 | 2.09 | 1.02 | 1.02 | — | — |
| $(La_2O_3 + Gd_2O_3 + Y_2O_3)/(B_2O_3 + SiO_2)$ | 0.338 | 0.343 | 0.341 | 0.322 | 0.346 | 0.348 |
| $B_2O_3/SiO_2$ | 10.29 | 10.13 | 10.24 | 10.80 | — | 15.57 |
| Refractive index nd | 1.75592 | 1.7591 | 1.75576 | 1.73071 | 1.75036 | 1.75085 |
| Abbé number νd | 51.25 | 50.98 | 51.31 | 53.97 | 51.64 | 51.53 |

TABLE 1-continued

|  |  |  |  |  |  |  |
|---|---|---|---|---|---|---|
| Glass transition temperature (° C.) | 618 | 611 | 617 | 628 | 621 | 621 |
| Sag temperature Ts (° C.) | 657 | 653 | 656 | 637 | 656 | 663 |
| Liquidus temperature LT (° C.) | 1040 | 1040 | 1040 | 1050 | 1030 | 1030 |
| Viscosity at liquidus temperature (dPa · s) | 5.17 | 5.36 | 5.26 |  | 3.79 | 4.2 |
| Specific gravity | 4.39 | 4.459 | 4.415 | 4.266 | 4.426 | 4.442 |
| Presence of exothermal peaks in temperature range Tg – (Tg + 120° C.) | Non | Non | Non | Non |  |  |
| Number of endothermal peaks in temperatrue range (LT – 100° C.) – LT | 1 | 1 | 1 | 1 |  |  |
| λ80 (nm) | 365 | 367 | 363 | 360 | 368 | 367 |
| λ70 (nm) | 344 | 344 | 343 | 341 | 346 | 345 |
| λ5 (nm) | 278 | 278 | 278 | 277 | 272 | 277 |

Evaluation of Thermal Characteristics

Figure 2:
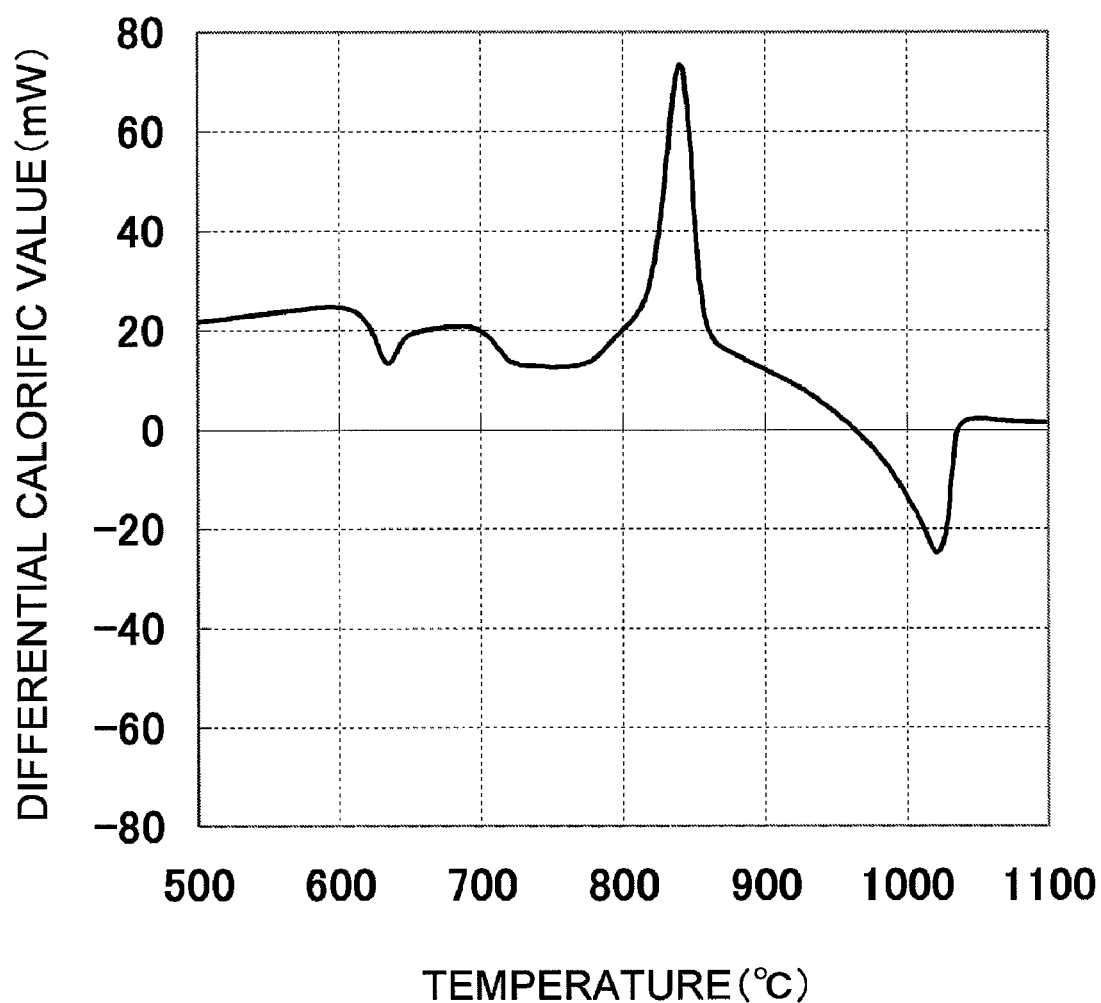
FIG. 2 is a differential thermal analysis curve of the optical glass of Example 2.
Figure 3:
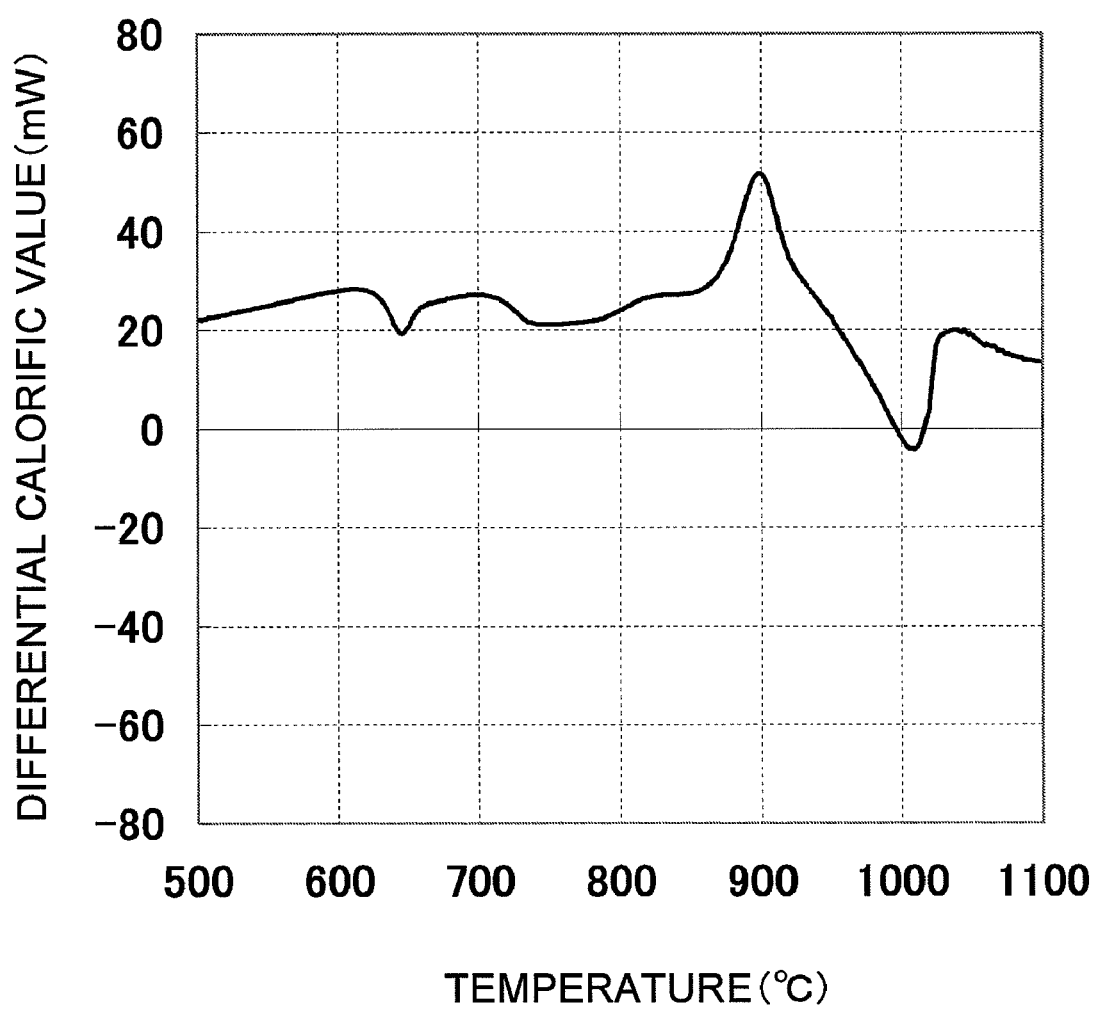
FIG. 3 is a differential thermal analysis curve of the optical glass of Example 11.
Figure 4:
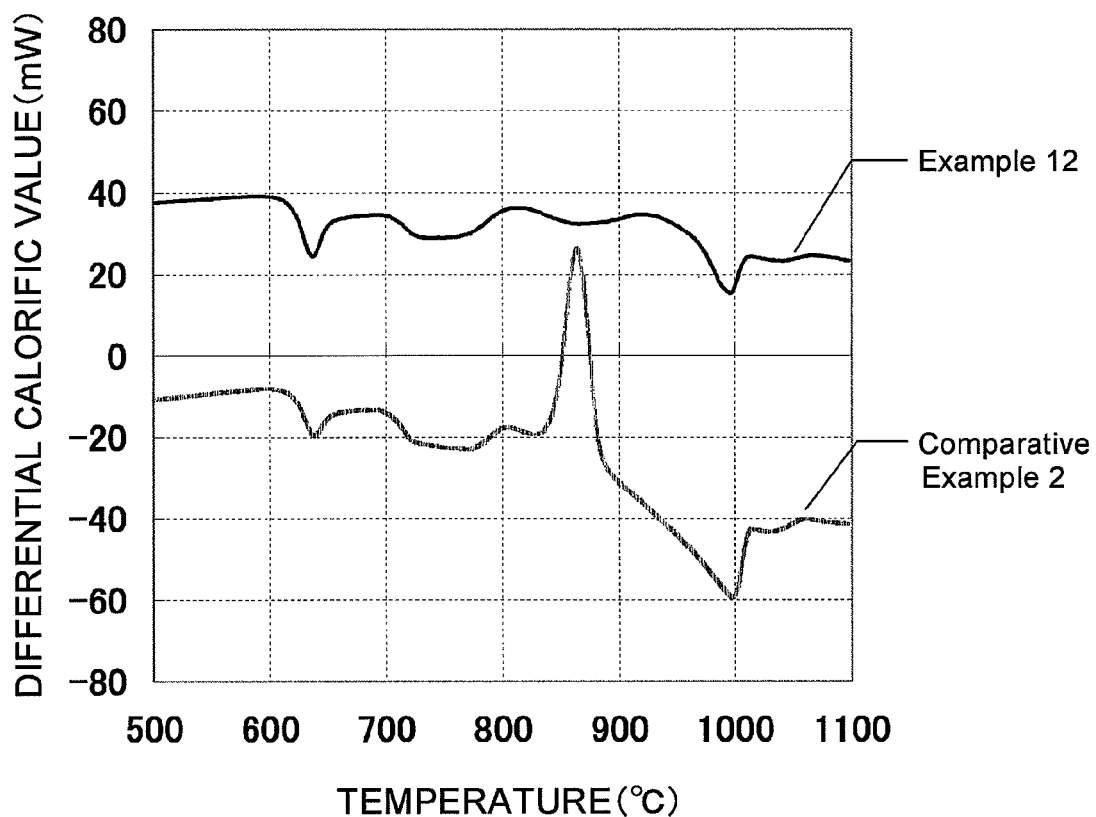
FIG. 4 is differential thermal analysis curves of the optical glass of Example 13 and Comparative Example 2.

The thermal characteristics of the optical glasses of Examples 2, 11, and 13 were measured at a rate of temperature increase of 10° C./minute with a differential scanning calorimeter (DSC 3300SA, made by Bruker AXS). The relation between the differential quantity of heat and temperature was measured. The differential thermal analysis curves obtained are shown in FIGS. 2 to 4.

Whether or not exothermic peaks were present in a temperature range greater than or equal to the glass transition temperature Tg but not exceeding a temperature 120° C. higher than the glass transition temperature (Tg+120° C.) and whether or not an endothermic peak was present in a temperature range greater than or equal to a temperature 100° C. lower than the liquidus temperature LT (LT−100° C.) but not greater than the liquidus temperature LT were similarly examined for the other optical glasses of the embodiments that were obtained. The results are given in Table 1.

Evaluation Results

Comparative Examples 1 and 2 were both compositions that contained no $Li_2O$. The stability of glasses that do not contain $Li_2O$ but do contain a large quantity of ZnO deteriorates. As shown in FIG. 4, a sharp crystallization peak was present and stability was poor in the glass of Comparative Example 2.

The composition of Comparative Example 1 contained no $SiO_2$. In this case, viscosity decreased and molding properties deteriorated sharply.

Manufacturing of a Preform for Precision Press Molding

Clarified and homogenized glass melts corresponding to Examples 1 to 17 were made to flow at a constant rate from a platinum alloy pipe at a temperature adjusted to within a range at which stable outflow was possible without devitrification of the glass. Either the dripping or drop-cut method was employed to separate glass melt gobs with the same mass as the targeted preforms, the glass melt gobs were received in receiving molds having gas blow holes in the bottom thereof, and preforms for precision press molding were formed while floating the glass gobs by blowing gas through the gas blow holes. The separation interval of the glass melt was adjusted to settings yielding spherical preforms and oblate spherical preforms.

Manufacturing of an Optical Element (Aspherical Lens)

Glass preforms obtained by the above-described method were precision press molded with the pressing machine shown in FIG. 1 to obtain aspherical lenses. Specifically, a preform was placed between a lower mold 2 and upper mold 1 constituting a pressing mold, the atmosphere within quartz tube 11 was replaced with nitrogen, and a heater (not shown) was supplied with power to heat the interior of quartz tube 11. The temperature within the pressing mold was set to a temperature at which the glass being molded exhibited a viscosity of $10^8$ to $10^{10}$ dPa·s. While maintaining this temperature, pressing rod 13 was dropped, upper mold 1 was pressed, and the preform that had been placed in the pressing mold was pressed. A pressure of 8 MPa was applied for a period of 30 seconds. After pressing, the pressure was released and the press molded glass article was annealed at a temperature at which the viscosity of the glass remained at $10^{12}$ dPa·s or greater with the article still in contact with lower mold 2 and upper mold 1. Rapid cooling to room temperature was then conducted, at which time the molded glass article was removed from the pressing mold, yielding an aspherical lens. In FIG. 1, holding member 10 holds lower mold 2 and sleeve mold 3, and support rod 9 supports upper mold 1, lower mold 2, sleeve mold 3, and holding member 10, bearing the pressure applied by pressing rod 13. A thermocouple 14 is inserted into lower mold 2 and monitors the temperature within the pressing mold.

The above lenses were suitable for use as lenses in image pickup optical systems. Objective lenses with a numerical aperture of 0.85 for DVDs were manufactured with a suitable pressing mold and preforms.

The present invention provides a high-refractive-index, low-dispersion optical glass suited to precision press molding. A preform for precision press molding can be manufactured from the optical glass of the present invention. The present invention further provides an optical element comprised of high-refractive index, low-dispersion glass.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. An optical glass having a refractive index nd of 1.70 or higher and an Abbé number nud of 50 or higher, comprising, denoted as molar percentages:

| | |
|---|---|
| $B_2O_3$ | 40 to 75 percent, |
| $SiO_2$ | greater than 0 percent but not exceeding 15 percent, |
| $Li_2O$ | 1 to 10 percent, |
| ZnO | 0 to 15 percent, |
| $La_2O_3$ | 5 to 22 percent, |
| $Gd_2O_3$ | 3 to 20 percent, |
| $Y_2O_3$ | greater than or equal to 0 percent but less than 1 percent, |
| $ZrO_2$ | 0 to 10 percent, |
| MgO | 0 to 5 percent, |
| F | 5 percent or less, |
| CaO | 0 to 5 percent, and |
| SrO | 0 to 5 percent. |

2. The optical glass in accordance with claim 1, wherein the molar ratio of $(La_2O_3+Gd_2O_3+Y_2O_3)/(B_2O_3+SiO_2)$ is 0.365 or less.

3. The optical glass in accordance with claim 1, wherein the molar ratio of $Y_2O_3/(La_2O_3+Gd_2O_3+Y_2O_3)$ is 0 to 0.2.

4. The optical glass in accordance with claim 1, wherein $B_2O_3/SiO_2$ exceeds 5.5.

5. The optical glass in accordance with claim 1, wherein the total quantity of $B_2O_3$, $SiO_2$, $Li_2O$, ZnO, $La_2O_3$, $Gd_2O_3$, $ZrO_2$, MgO, CaO, and SrO is 97 molar percent or greater; $Ta_2O_5$ is incorporated as an optional component; the molar ratio of $ZnO/(La_2O_3+Gd_2O_3)$ is 0.5 or lower; the molar ratio of $(CaO+SrO+BaO)/(La_2O_3+Gd_2O_3)$ is 0.2 or lower; and the molar ratio of $(ZrO_2+Ta_2O_5)/(La_2O_3+Gd_2O_3)$ is 0.4 or less.

6. The optical glass in accordance with claim 1, wherein the total quantity of $Li_2O$ and ZnO is 5 to 15 molar percent and the molar ratio of $ZnO/Li_2O$ is 3 or less.

7. The optical glass in accordance with claim 1, wherein the glass transition temperature Tg is 635° C. or lower and the liquidus temperature LT is 1,100° C. or lower.

8. The optical glass in accordance with claim 1, wherein thermal characteristics measured by differential scanning calorimetry satisfy (a) and (b) below:
    (a) no exothermic peak is present in a temperature range greater than or equal to the glass transition temperature Tg but not exceeding a temperature 120° C. higher than the glass transition temperature (Tg+120° C.);
    (b) only one endothermic peak is present within a temperature range greater than or equal to a temperature 100° C. lower than the liquidus temperature LT (LT−100° C.) but not exceeding the liquidus temperature LT.

9. The optical glass in accordance with claim 1, wherein the glass has a refractive index nd and an Abbé number nud satisfying equation (1) below:

$$nd \geq 2.25 - 0.01 \times nud \quad (1).$$

10. An optical glass having a refractive index nd of 1.70 or higher and an Abbé number nud of 50 or higher, comprising, denoted as molar percentages:

| | |
|---|---|
| $B_2O_3$ | 40 to 75 percent, |
| $SiO_2$ | greater than 0 percent but not exceeding 15 percent, |
| $Li_2O$ | 1 to 10 percent, |
| ZnO | 0 to 15 percent, |
| $La_2O_3$ | 5 to 22 percent, |
| $Gd_2O_3$ | 3 to 20 percent, |
| $ZrO_2$ | greater than 5 percent but not exceeding 10 percent, |
| MgO | 0 to 5 percent, |
| F | 5 percent or less, |
| CaO | 0 to 5 percent, and |
| SrO | 0 to 5 percent. |

11. The optical glass in accordance with claim 10, wherein $B_2O_3/SiO_2$ exceeds 5.5.

12. The optical glass in accordance with claim 10, wherein the total quantity of $B_2O_3$, $SiO_2$, $Li_2O$, ZnO, $La_2O_3$, $Gd_2O_3$, $ZrO_2$, MgO, CaO, and SrO is 97 molar percent or greater; $Ta_2O_5$ is incorporated as an optional component; the molar ratio of $ZnO/(La_2O_3+Gd_2O_3)$ is 0.5 or lower; the molar ratio of $(CaO+SrO+BaO)/(La_2O_3+Gd_2O_3)$ is 0.2 or lower; and the molar ratio of $(ZrO_2+Ta_2O_5)/(La_2O_3+Gd_2O_3)$ is 0.4 or less.

13. The optical glass in accordance with claim 10, wherein the total quantity of $Li_2O$ and ZnO is 5 to 15 molar percent and the molar ratio of $ZnO/Li_2O$ is 3 or less.

14. The optical glass in accordance with claim 10, wherein the glass transition temperature Tg is 635° C. or lower and the liquidus temperature LT is 1,100° C. or lower.

15. The optical glass in accordance with claim 10, wherein thermal characteristics measured by differential scanning calorimetry satisfy (a) and (b) below:
    (a) no exothermic peak is present in a temperature range greater than or equal to the glass transition temperature Tg but not exceeding a temperature 120° C. higher than the glass transition temperature (Tg+120° C.);
    (b) only one endothermic peak is present within a temperature range greater than or equal to a temperature 100° C. lower than the liquidus temperature LT (LT−100° C.) but not exceeding the liquidus temperature LT.

16. The optical glass in accordance with claim 10, wherein the glass has a refractive index nd and an Abbé number nud satisfying equation (1) below:

$$nd \geq 2.25 - 0.01 \times nud \quad (1).$$

17. A preform for precision press molding comprised of the optical glass in accordance with claim 1.

18. An optical element comprised of the optical glass in accordance with claim 1.

19. A method for manufacturing a preform for precision press molding in which a glass melt gob is separated from an outflowing glass melt, and the glass melt gob is formed into a preform for precision glass molding in a cooling step, characterized in that:
    the preform for precision press molding that is formed is comprised of the optical glass in accordance with claim 1.

20. A method for manufacturing an optical element by heating a preform for precision press molding in accordance with claim 1 and conducting precision press molding.

21. The method for manufacturing an optical element in accordance with claim 20 comprising introducing a preform for precision press molding into a pressing mold, heating the preform along with the pressing mold, and conducting precision press molding.

22. The method for manufacturing an optical element in accordance with claim 20 comprising heating a preform for precision press molding, introducing said preform into a preheated pressing mold, and conducting precision press molding.

23. A method for manufacturing an optical element by heating a preform for precision press molding that has been manufactured by a method in accordance with claim 19 and conducting precision press molding.

24. The method for manufacturing an optical element in accordance with claim 23 comprising introducing a preform for precision press molding into a pressing mold, heating the preform along with the pressing mold, and conducting precision press molding.

25. The method for manufacturing an optical element in accordance with claim 23 comprising heating a preform for precision press molding, introducing said preform into a preheated pressing mold, and conducting precision press molding.

26. A preform for precision press molding comprised of the optical glass in accordance with claim 10.

27. An optical element comprised of the optical glass in accordance with claim 10.

28. A method for manufacturing a preform for precision press molding in which a glass melt gob is separated from an outflowing glass melt, and the glass melt gob is formed into a preform for precision glass molding in a cooling step, characterized in that:
the preform for precision press molding that is formed is comprised of the optical glass in accordance with claim 10.

29. A method for manufacturing an optical element by heating a preform for precision press molding in accordance with claim 10 and conducting precision press molding.

30. The method for manufacturing an optical element in accordance with claim 29 comprising introducing a preform for precision press molding into a pressing mold, heating the preform along with the pressing mold, and conducting precision press molding.

31. The method for manufacturing an optical element in accordance with claim 29 comprising heating a preform for precision press molding, introducing said preform into a preheated pressing mold, and conducting precision press molding.

32. A method for manufacturing an optical element by heating a preform for precision press molding that has been manufactured by a method in accordance with claim 28 and conducting precision press molding.

33. The method for manufacturing an optical element in accordance with claim 32 comprising introducing a preform for precision press molding into a pressing mold, heating the preform along with the pressing mold, and conducting precision press molding.

34. The method for manufacturing an optical element in accordance with claim 32 comprising heating a preform for precision press molding, introducing said preform into a preheated pressing mold, and conducting precision press molding.

35. The optical glass in accordance with claim 1, wherein the content of F is 3 percent or less.

36. The optical glass in accordance with claim 10, wherein the content of F is 3 percent or less.

37. The optical glass in accordance with claim 1, wherein F is not incorporated.

38. The optical glass in accordance with claim 10, wherein F is not incorporated.

* * * * *